INVENTORS:
JOSEPH C. SCHUMACHER
FRANK H. MAY
BY:
ATTORNEY

United States Patent Office 3,336,103
Patented Aug. 15, 1967

3,336,103
PROCESS FOR PRODUCING ANHYDROUS SODIUM TETRABORATE
Joseph C. Schumacher, Los Angeles, and Frank H. May, Whittier, Calif., assignors to American Potash & Chemical Corporation, Los Angeles, Calif., a corporation of Delaware
Filed Nov. 30, 1962, Ser. No. 241,433
8 Claims. (Cl. 23—59)

The present invention relates to a novel method for extracting borate values from borate containing ores and to the production of a novel form of readily soluble anhydrous sodium tetraborate.

Large deposits of borate ore containing sodium tetraborate values in the form of the mineral kernite ($Na_2B_4O_7 \cdot 4H_2O$) have been known. The ore has not been used as a commercial source of sodium tetraborate, however, because of the seemingly difficult solubility of the kernite portion of the ore in water. Previously it was thought that super-atmospheric pressures were necessary in the digestor in order to achieve temperatures which would dissolve the kernite in water.

The surprising discovery now has been made of a novel method for treating borate ores containing kernite whereby the sodium tetraborate values therein can readily be recovered. Furthermore, it has been discovered that practice of the process results in the production of a novel form of non-fused, anhydrous sodium tetraborate which has a relatively high rate of solubility in water.

Throughout this specification and the appended claims, the term "anhydrous sodium tetraborate" will be understood to include those sodium tetraborates which contain less than about one mole of water of hydration per mole of sodium tetraborate.

In general, the process of the present invention comprise:

(A) contacting a borate ore containing kernite with an aqueous phase to produce a liquid mixture comprising a solution of sodium tetraborate values having particles of gangue such as shale and clay suspended therein.

(B) The liquid mixture then is subjected to a phase separation whereby a substantially gangue-free liquor is produced.

(C) Thereafter, the liquor is heat-treated to recover the desired sodium tetraborate values. The heat treatment is carried out in a manner whereby the water in the liquor is evaporated rapidly, leaving a solid deposit of anhydrous sodium tetraborate. In accordance with a preferred treatment, the liquor is sprayed onto the surface of a mass of heated particles of anhydrous sodium tetraborate which has previously been prepared.

For a more complete understanding of the present invention reference is made to the following description and the appended drawings in which.

Figure 1:
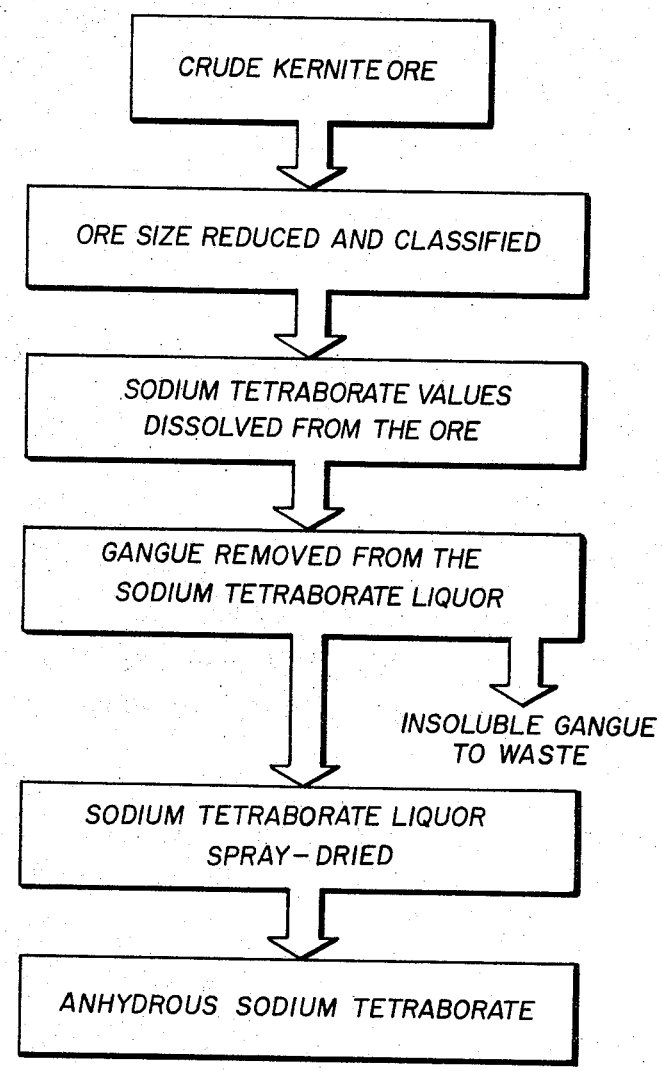
FIGURE 1 is a schematic flow sheet illustrating the preferred steps of this invention.

Referring specifically to FIG. 1, the preferred procedure for the treatment of run-of-the-mine borate ore containing kernite to produce anhydrous sodium tetraborate is illustrated diagrammatically. This process can be carried out continuously as one overall operation or batchwise with the individual steps being carried out independently of one another. While the preferred procedure has been illustrated, it will be understood that the spray drying step can be applied to any liquid mixture of sodium tetraborate values obtained from any source whatsoever. Moreover, if desired, the sodium tetraborate liquor obtained from the dissolution of kernite ore can be treated according to conventional procedures to produce hydrated sodium tetraborates, e.g., by crystallization from the liquor.

As is more particularly illustrated in FIG. 1 a crude borate ore containing kernite as it comes from the mine is subjected to a size reduction and classification step so as to produce a particulate feed for the dissolving step. The particulate ore can then be treated according to the preferred steps illustrated in FIG. 1. Sodium tetraborate values are extracted from the ore by treating the ore with a hot aqueous medium. After the sodium tetraborate values in the ore have been solubilized, insoluble gangue particles are removed and disposed of as waste. The sodium tetraborate liquor remaining then is spray-dried to recover anhydrous sodium tetraborate therefrom.

As indicated above, the process of the present invention is applicable to the treatment of run-of-the-mine borate ores containing kernite. Frequently, such ores also contain considerable amounts of gangue and other minerals including, for example, borate minerals such as tincal, boracite, ulexite, colemanite, and the like. The kernite-containing ore can be prepared for use in this invention by conventional techniques including, for example, crushing, grinding, milling, screening and the like, size-reduction and classification operations. Conventional dry benefication procedures also can be employed to increase the concentration of the borate values in the ore, if desired.

The kernite ore can be calcined if desired but this is not necessary. However, in certain instances it is advantageous to calcine the ore because this facilitates its later solubilization and subsequent separation of the gangue from the sodium tetraborate liquor. Calcination can be accomplished by conventional techniques in conventional apparatus at elevated temperatures, for example, between about 200° C. and 300° C.

The kernite-containing ore, prepared as indicated above, then is treated to solubilize the sodium tetraborate values therein by heating an aqueous liquid mixture of the ore at atmospheric pressure. It has been determined that more than about 80% of the sodium tetraborate values in the ore will dissolve in the water when the mixture is maintained at a temperature of about 70° C. to about 99° C. for a period of about 10 minutes to about 140 minutes. The best results are obtained at a temperature within the range of about 85° C. and 99° C. for a period of about 60 to 120 minutes. Preferably, the mixture is maintained at a temperature of just below its boiling point (viz., 100° C.) for a period of time sufficient to dissolve at least about 85% of the sodium tetraborate values contained therein.

The concentration of the sodium tetraborate in the aqueous phase can be varied as desired. It should not exceed, however, the saturation point as this would prevent the dissolution of the kernite at the temperatures involved. Initially, the liquid medium can be either water or a dilute aqueous sodium tetraborate solution recycled from a later stage in the process. The dissolving operation just described can be accomplished by batch, semi-continuous, countercurrent for concurrent procedures as desired.

Run-of-the-mine kernite ores generally contain small amounts of water-insoluble borates, principally as calcium borates. These calcium borates are generally present as ulexite and its lower hydrates. Such insoluble borates can be solubilized, if desired, in the kernite dissolving step by the addition of sodium carbonate. The carbonate addition can be accomplished conveniently by adding a small amount of crude trona ($Na_2CO_3 \cdot NaHCO_3 \cdot 2H_2O$) to the aqueous phase during the dissolving operation. Generally, no more than about 2% by weight, based on the total weight of the aqueous ore mixture, of carbonate is required for this purpose.

As indicated, the liquid mixture obtained after the kernite dissolving operation generally will contain water-insoluble gangue as fine particles suspended in the liquid phase. These particles can be removed by liquid phase-solid phase separation techniques including, for example, centrifugal separation, filtration, settling with or without the addition of flocculation or filtration aids, and the like. The separation can be accomplished in one or a plurality of stages by concurrent, countercurrent, continuous or batch procedures.

Filtration can be accomplished, for example, by the use of a rotary drum filter and settling can be accomplished by the use of thickeners with decantation of the sodium tetraborate liquor. If the insoluble borate values have been solubilized by the addition of carbonates in the kernite dissolving operation, the insoluble calcium carbonate values are removed from the sodium tetraborate liquor and discarded along with the gangue during this liquid phase-solid phase separation step. It is desirable to remove the calcium values during this stage to avoid the build-up of insoluble calcium deposits at other points in the process.

While the solid-liquid phase separation can be accomplished by settling, filtering or centrifuging as desired, a particularly desirable procedure for this phase separation involves the use of plural thickeners with countercurrent multi-stage decantation.

The concentration of the sodium tetraborate in the liquid phase during the liquid phase-solid phase separation can be adjusted as desired as long as the saturation point is not exceeded. If the saturation point were exceeded, a solid phase of sodium tetraborate would form and be separated out and discarded with the gangue as waste, resulting in an undesirable loss of product. The use of very dilute solutions of much less than about 1% are not desirable because of the large volumes of water involved.

The novel anhydrous sodium tetraborate of this invention then is produced by removing substantially all of the water from the liquid mixture by subjecting the same to a temperature between the temperature at which the hydrates of sodium tetraborate form and the fusion temperature of anhydrous sodium tetraborate. Thus, the liquid mixture containing sodium tetraborate values is contacted with a drying medium which is heated to such a temperature that the sodium tetraborate is maintained between these temperatures as it is in transition from the liquid phase to the anhydrous form. In general, the drying medium is maintained at a temperature between about 400° C. and about 700° C. If the drying medium is maintained between these temperatures, generally the anhydrous sodium tetraborate will be formed with less than about 2% by weight of water of hydration and the product will be substantially unfused. Preferably the drying medium is maintained at a temperature between 450° C. and 650° C. It will be understood that the temperature of the drying medium itself is not critical so long as the temperature at which the sodium tetraborate forms is above the temperaure at which the hydrates of sodium tetraborate form (about 400° C.) and below the temperature at which the product fuses (about 700° C.). Below 400° C. the product puffs and excessive fines are produced, while above 700° C. the product fuses and sticks together.

Whether or not hydrates of sodium tetraborate are being formed is determinable by conventional analytical procedures and whether or not a fused product is being formed is readily determinable by examining the product under a microscope. The fused anhydrous sodium tetraborate resembles particles of glass whereas the unfused anhydrous sodium tetraborate appears as a translucent nodular agglomerate. The fused and unfused anhydrous sodium tetraborates can be further differentiated from one another by observing their respective rates of solution in water.

Liquid mixtures of sodium tetraborate values which can be utilized to produce the novel form of anhydrous sodium tetraborate of this invention include, for example, super-be utilized to produce the novel form of anhydrous sodium tetraborate as well as slurries of sodium tetraborate liquor containing particles of crystallized sodium tetraborate hydrates. The liquid mixture can be heated or not as desired. Preferably, solutions of sodium tetraborate are utilized since this avoids the necessity of dehydrating already formed crystals of sodium tetraborate hydrates. Preferably the liquid mixture of sodium tetraborate values is preheated before it is contacted with the drying medium since this facilitates the removal of water and also permits the use of highly concentrated liquid mixtures of sodium tetraborate values. The liquid mixture can, however, be at any temperature between its boiling point and its freezing point. The concentration of the sodium tetraborate values in this liquid mixture can be adjusted as desired from a dilute solution of about 5% to a saturated slurry containing undissolved crystals of sodium tetraborate hydrates. The use of very dilute solutions is undesirable because of the difficult in removing large amounts of water upon contact with the drying medium.

The heated medium with which the liquid mixture of sodium tetraborate values is contacted for example, can be a heated surface or a heated gas or a combination of these. Preferably, the liquid mixture is contacted with a heated surface which can be either a solid unitary surface or a broken porous surface which is in contact with a heated gas. More preferably, the liquid mixture is contacted with a broken porous surface which can include, for example, a particulate bed of anhydrous sodium tetraborate, fluidized or not as desired. A particularly desirable procedure involves contacting the liquid mixture with a bed of particulate anhydrous sodium tetraborate. Conveniently, the particles are agitated so as to provide a continuously fresh surface to the liquid mixture and remove the product as it is formed.

A particularly desirable procedure for producing anhydrous sodium tetraborate comprises applying, as by spraying, the liquid mixture containing sodium tetraborate values onto a heated, agitated bed of particles, preferably particles of anhydrous sodium tetraborate which is swept by currents of heated gas. This procedure can be accomplished, for example, by spraying the liquid mixture onto the surface of a bed of particulate anhydrous sodium tetraborate contained in a rotary kiln. Advantageously, a current of heated gas sweeps the interior of the kiln in contact with the particulate bed and the external surface of the kiln is heated. The rotation of the kiln provides for the agitation and distribution of the particles of anhydrous sodium tetraborate.

Throughout the specification, the specific examples and the appended claims, all parts and percentages are by weight unless otherwise indicated. The following specific examples are presented to even more specifically illustrate the invention. These examples are presented for purposes of illustration and are not to be construed as limiting the invention in any way.

In the following examples, Examples I to V and VIII are illustrative of the individual steps of the process while Examples VI and VII illustrate the complete process of this invention. Examples II and IV are carried out using pure kernite whereas the remainder of the examples are carried out using crude kernite ore.

Example I illustrates the time required to dissolve the $Na_2B_4O_7$ values contained in crude kernite ore.

Example I.—Dissolution of kernite ore

A quantity of kernite ore having the following composition is ground, milled and screened to −8 mesh:

| | Weight, percent |
|---|---|
| $Na_2B_4O_7 \cdot 10H_2O$ | 38.81 |
| $Na_2B_4O_7 \cdot 4H_2O$ | 33.49 |
| Total insoluble (gangue) | 27.30 |
| $Na_2CO_3$ | 0.40 |

A 385 g. sample of this ore containing the equivalent of about 46.7% $Na_2B_4O_7$ is contacted with about 500 ml. of water maintained at a constant temperature of about 85° C. The results are set forth below. The numbers in the column entitled "Percent of $Na_2B_4O_7$ Into Solution" represent the percentage of $Na_2B_4O_7$ which has dissolved in the water based on the dry weight of the $Na_2B_4O_7$ equivalent in the ore originally.

| Leach time, (minutes): | Percent of $Na_2B_4O_7$ into solution |
|---|---|
| 5 | 73.7 |
| 12 | 87.1 |
| 15 | 89.5 |
| 20 | 91.0 |
| 30 | 94.2 |
| 45 | 94.7 |
| 90 | 99.0 |
| 180 | 100.0 |

The leach liquor contains about 15.62% $Na_2B_4O_7$, based on the weight of the liquor, at the end of 5 minutes and about 20.98% at the end of 90 minutes.

Example II illustrates the time required to dissolve the $Na_2B_4O_7$ values contained in crystals of the mineral, kernite.

Example II.—Dissolution of kernite

Kernite crystals having the composition of $$Na_2B_4O_7 \cdot 4H_2O$$

are finely crushed and a 190 g. quantity of this crushed material is contacted with 500 ml. of water maintained at a constant temperature of about 85° C. The results are set forth below. The numbers in the column entitled "Percent of $Na_2B_4O_7$ Into Solution" represent the percentage of $Na_2B_4O_7$ which has dissolved in the water based on the dry weight of the $Na_2B_4O_7$ equivalent in the kernite originally.

| Leach time, (minutes): | Percent of $Na_2B_4O_7$ into solution |
|---|---|
| 7 | 74.6 |
| 10 | 84.9 |
| 15 | 91.5 |
| 20 | 92.9 |
| 40 | 96.6 |
| 90 | 99.5 |
| 180 | 100.0 |

The leach liquor contains about 14.62% $Na_2B_4O_7$, based on the weight of the liquor, at the end of 7 minutes and about 19.52% at the end of 90 minutes.

Example III illustrates the advantages obtained from calcining crude kernite ore prior to the dissolving step.

Example III.—Dissolution of calcined kernite ore

A sample of the kernite ore described in Example I, above, is calcined at 260° C. for a period of 42 minutes. A 371 g. sample of this calcined ore is contacted with 500 ml. of water maintained at a constant temperature of about 85° C. The results are indicated below. The column entitled "Percent of $Na_2B_4O_7$ Into Solution" indicates the percentage of $Na_2B_4O_7$ dissolved in the water based on the dry weight of the $Na_2B_4O_7$ equivalent originally in the ore.

| Leach time, (minutes): | Percent of $Na_2B_4O_7$ into solution |
|---|---|
| 5 | 99.5 |
| 10 | 100.0 |

The leach liquor contains about 26.41% $Na_2B_4O_7$, based on the weight of the liquor, at the end of 10 minutes.

Example IV illustrates the effect of temperature on the dissolving step as applied to the mineral, kernite.

Example IV.—Dissolution of kernite at varying temperatures

A mixture of crushed kernite crystals ($Na_2B_4O_7 \cdot 4H_2O$) of which one half had a particle size of from −8 to +20 mesh and one half had a particle size of from −20 to +30 mesh, is divided into 2 portions of 150 g. each. Each of these portions is mixed with a separate 500 ml. portion of water. The first mixture is maintained at a constant temperature of about 75° C. with the following results—

| Leach time, (minutes): | Percent $Na_2B_4O_7$ in leach solution |
|---|---|
| 5 | 7.22 |
| 10 | 9.56 |
| 60 | 14.18 |
| 90 | 14.96 |
| 120 | 15.45 |
| 180 | 15.84 |

The percentages given in the second column, above, are based on the weight of the leach solution.

About 90.98% of the boron in the original 150 g. sample is dissolved.

The second mixture is maintained at a constant temperature of about 92° C. with the following results:

| Leach time (minutes): | Percent $Na_2B_4O_7$ in leach solution |
|---|---|
| 5 | 11.70 |
| 10 | 13.45 |
| 30 | 16.11 |
| 60 | 16.67 |
| 90 | 16.90 |
| 120 | 17.04 |
| 180 | 17.08 |

About 99.68% of the boron in the original 150 g. sample is dissolved.

Example V illustrates the settling rates encountered in separating gangue from a sodium tetraborate liquor.

Example V.—Settling of gangue from sodium tetraborate liquors

A quantity of the calcined kernite ore prepared in Example III, above, is leached with water at 95° C. for 85 minutes to produce a 20% $Na_2B_4O_7$ solution containing 10 pounds of dissolved $Na_2B_4O_7$ mixed with 6 pounds of insoluble gangue. The mixture is allowed to stand undisturbed at 185° C. for 24 hours during which time the gangue settles leaving a gangue-free $Na_2B_4O_7$ solution on top of the gangue-containing layer. The gangue-containing layer when withdrawn is found to contain 6 pounds of insoluble gangue and 2.9 pounds of dissolved $Na_2B_4O_7$. The gangue content of the settled gangue-containing layer is 29.5%. Substantially all of the $Na_2B_4O_7$ can be separated from the gangue, if desired, by the use of a plurality of settling stages with countercurrent decantation and washing, instead of the single stage described above.

The gangue can be separated from the liquor by the more complicated and expensive procedures of filtering or centrifuging. Filtering can be accomplished conveniently using a rotary drum filter.

A quantity of the kernite ore prepared in Example I, above, is leached with water at 85° C. for 110 minutes to produce a 20% $Na_2B_4O_7$ solution containing 15 pounds of dissolved $Na_2B_4O_7$ mixed with 9.1 pounds of insoluble gangue. The mixture is allowed to stand undisturbed at 185° F. for 24 hours. At the end of this time, the gangue is settled so that there is a gangue-free $Na_2B_4O_7$ solution on top of the gangue-containing layer. The gangue-containing layer when withdrawn is found to contain 9.1 pounds of gangue and 5.1 pounds of dissolved $Na_2B_4O_7$. The gangue content of the settled gangue-containing layer is 26.4%. The somewhat higher gangue concentration (29.5%) obtained when using a calcined ore, above, is attributable to the calcination step and shows the advantage gained through the use of calcination.

The following two parts of this example illustrate the settling of gangue from very dilute $Na_2B_4O_7$ solutions. These conditions approximate those existing in the last stage of a plurality of countercurrently operated thickeners.

A quantity of the kernite ore prepared in Example I, above, is leached with water at 75° C. for 140 minutes and then diluted with water to produce a 2.2% solution of $Na_2B_4O_7$ containing 8 pounds of dissolved $Na_2B_4O_7$ and 4.2 pounds of gangue. The mixture is allowed to stand undisturbed at 185° F. for 24 hours. The settled gangue-containing layer is withdrawn and analyzed. The gangue-containing layer is found to contain 4.2 pounds of gangue, 0.18 pound of $Na_2B_4O_7$ and the gangue content of the settled layer is 33.7%.

A quantity of the kernite ore, prepared in Example I, above, is leached with water at 90° C. for 90 minutes and is diluted to produce a 2.6% $Na_2B_4O_7$ solution containing 10 pounds of dissolved $Na_2B_4O_7$ mixed with 6 pounds of insoluble gangue. The mixture is allowed to stand undisturbed at 113° F. for 24 hours and the settled gangue-containing layer is withdrawn and analyzed. The gangue layer is found to contain 6 pounds of gangue and 0.17 pound of dissolved $Na_2B_4O_7$. The gangue content of this layer is 49.1% gangue.

Comparison of the amounts of dissolved $Na_2B_4O_7$ entrapped in the waste gangue layer using a 20% $Na_2B_4O_7$ solution as compared to a 2.2% or 2.6% solution illustrates the advantages of using plural thickeners with countercurrent decantation. Since, in a countercurrent settling and decantation operation the last liquor to contact the gangue layer is at a concentration of about 2%, it is possible to separate substantially all of the dissolved $Na_2B_4O_7$ from the gangue by this procedure.

Example VI illustrates the treatment of crude kernite ore to produce anhydrous sodium tetraborate.

Example VI.—Processing kernite ore to anhydrous sodium tetraborate

Pulverized kernite ore is mixed with water and leached by heating the liquid mixture at a temperature of about 92° C. for a period of 90 minutes. The resulting mixture of sodium tetraborate solution and insoluble gangue is allowed to stand undisturbed for about 24 hours. The insoluble gangue settles out and is removed. The remaining liquid mixture is heated to a temperature just below its boiling point and conveyed to a spray drier wherein it is sprayed onto the surface of an agitated mass of particulate anhydrous sodium tetraborate. The bed of anhydrous sodium tetraborate is maintained at a temperature of about 575° C. and is swept continuously with a current of heated gas having a vent temperature of 500° C. The bed is constantly recirculated through a rotary kiln. The kiln is heated externally and a flame is provided at the entrance to the kiln so that it may actually occasionally play upon the surface of the bed within the kiln. This flame is the source of the heated current of gas within the kiln. As the liquid mixture is sprayed onto the bed in the kiln the water is evaporated instantly and anhydrous sodium tetraborate is deposited on the bed so as to form agglomerates. The bed is continuously withdrawn from the kiln and screened. The larger agglomerates are taken to storage, size reduction treatment or other use while the smaller agglomerates are recirculated to the kiln. The dust is collected from the vent gas stream and is recycled to the kiln. In this way the smaller agglomerates and dust particles grow into large agglomerates as anhydrous sodium tetraborate is deposited on them in the kiln. An unfused, agglomerated, anhydrous sodium tetraborate product is produced which dissolves readily in water. About 96% of the $Na_2B_4O_7$ values present in the kernite ore are recovered as anhydrous sodium tetraborate.

Example VII.—Fluidized bed

The procedures of Example VI are repeated except that the solution of sodium tetraborate is dried by contacting it with a fluidized bed of particulate anhydrous sodium tetraborate maintained at a temperature between about 575 and 610° C. The bed is fluidized by an upwardly directed stream of gas heated to a temperature within the range of 515° C. to 610° C. A product is obtained which is substantially the equivalent of that obtained in Example VI.

Example VIII illustrates the spray drying operation of this invention which produces a novel anhydrous sodium tetraborate.

Example VIII.—Spray drying of sodium tetraborate solution

A sodium tetraborate liquor is prepared and spray-dried on a bed of particulate anhydrous sodium tetraborate (−8 mesh) in a rotary kiln. Heat is applied externally to the rotary kiln and a stream of heated air is forced through the kiln. Product is continuously withdrawn from the rotary kiln, a portion of which is recycled to the kiln. The concentration of the $Na_2B_4O_7$ in the spray liquor may vary from 15% to 30% during the above described spray drying operations without any substantial effect on the product. The temperature of the liquor being sprayed is generally maintained at about the boiling point of the liquor. The following conditions and results are observed.

| Bed Temp. (° C.) | Vent Gas Temp. (° C.) | Product Bulk Density (lb./ft.³) |
|---|---|---|
| 350–580 | 550 | 35.6 |
| 460–475 | 480 | 41.4 |
| 595–610 | 600 | 67.6 |
| 665–700 | 625 | 69.9 |

The product having a bulk density of 35.6 pounds per cubic foot is very light and tends to dust badly while that having a density of 69.9 pounds per cubic foot is agglomerated into large particles which have almost started to fuse together.

All of the mesh sizes noted in specific examples, specification and appended claims are Tyler screen sizes.

Figure 2:
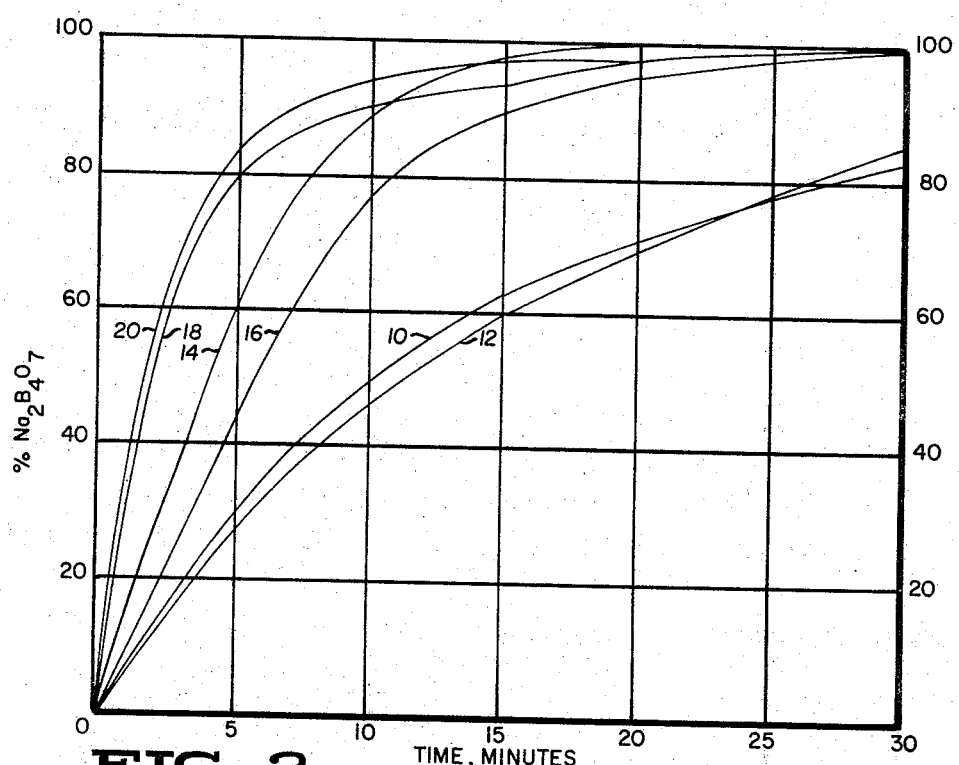
FIG. 2 is a graph illustrating the comparative rates of solution of the anhydrous sodium tetraborate of this invention and conventional fused anhydrous sodium tetraborate.

The novel form of non-fused, agglomerated, anhydrous sodium tetraborate produced by the process of the present invention is more readily soluble in water than is anhydrous sodium tetraborate produced by a fusion process. FIG. 2 is a graph containing curves which illustrate the rates of solution of various sodium tetraborate products.

Curves 10 and 14 through 20 illustrate the rate of solution of five different samples of anhydrous sodium tetraborate. Curve 10 represents the solubility rate of conventional fused anhydrous sodium tetraborate in water.

Curves 14 through 20 represent the solubility rate of four different samples of the novel form of anhydrous sodium tetraborate prepared in accordance with the present invention. The sample of curve 14 was prepared by spraying on a bed of anhydrous sodium tetraborate maintained at 400° C., that of curve 16 at 450° C., that of curve 18 at 525° C. and that of curve 20 at 575° C.

Curve 12 represents the solubility rate of crystalline sodium tetraborate pentahydrate in water.

Examination of these curves discloses that the novel product of this invention (curve 14 through curve 20)

dissolves much quicker than does conventional anhydrous sodium tetraborate (curve 10). Moreover, the novel product of this invention dissolves even more rapidly than does a sample of sodium tetraborate pentahydrate (curve 12) tested in the same manner.

The data from each of the curves in FIG. 2 was plotted and collected under the identical conditions described below unless specifically indicated otherwise.

A 13.80 g. sample of sodium tetraborate having a size distribution of −30 +100 mesh was admixed with 500 ml. of distilled water in an 800 ml. beaker with constant stirring. The temperature of the mixture was maintained at a constant value of 30° C.±0.5° C. for the duration of the test.

Stirring was accomplished in the 800 ml. beaker using a paddle measuring 2 inches by ¾-inch having the ends rounded with a ¼-inch radius. This paddle was driven at 400 revolutions per minute while immersed completely in the liquid with the longitudinal axis vertical.

About 95% of the novel product of this invention, based on the dry weight of the anhydrous sodium tetraborate, dissolves in water under the above described conditions in less than about 20 minutes and substantially 100% of the product dissolves in 30 minutes. This is graphically illustrated by curves 14 through 20 in FIG. 2.

Figure 3:
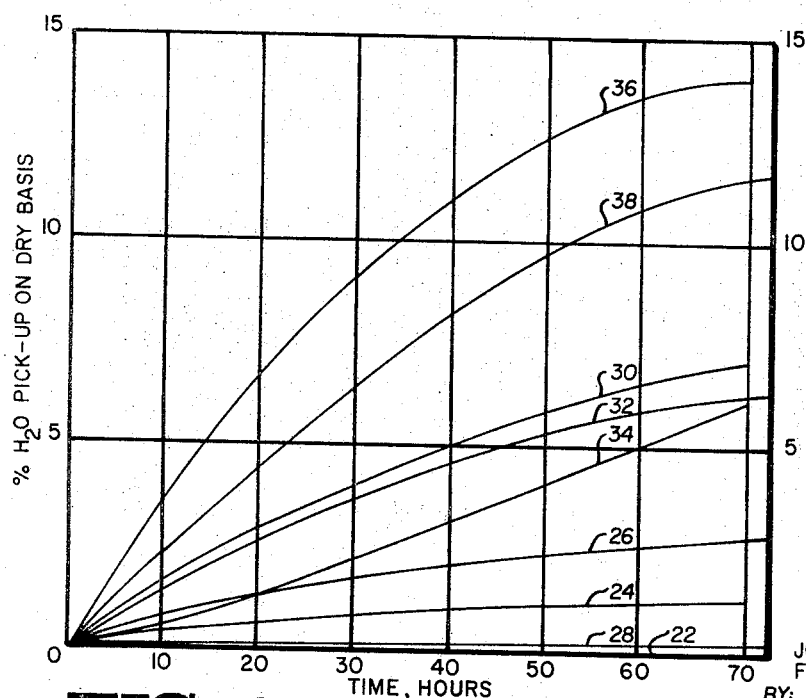
FIG. 3 is a graph illustrating the comparative rates of hydration of various samples of the anhydrous sodium tetraborate of this invention compared to conventional anhydrous sodium tetraborate at various levels of humidity.

FIG. 3 is a graph which represents the rates of hydration of the anhydrous sodium tetraborate product of this invention as compared to conventional fused anhydrous sodium tetraborate. The abscissa of this graph is time and the ordinate is the weight percent of water picked up by the anhydrous product based on the dry weight of the product.

Curves 22, 24 and 26 represent the hydration rates at 40% relative humidity, of conventional fused anhydrous sodium tetraborate, the novel anhydrous sodium tetraborate of this invention and ¼-inch pellets of the product of this invention, respectively.

Curves 28, 30 and 32 represent the rates of hydration at 60% relative humidity for conventional fused anhydrous sodium tetraborate, the anhydrous sodium tetraborate of this invention, and ¼-inch pellets of the product of this invention, respectively.

Curves 34, 36 and 38 represent the rates of hydration at 80% relative humidity for conventional fused anhydrous sodium tetraborate, the anhydrous sodium tetraborate of this invention and ¼-inch pellets of the product of this invention, respectively.

All of the data from which these curves were drawn was compiled using milled sodium tetraborate having a particle size within the range of −30 +100 mesh and the humidities were measured at 25° C.

The ¼-inch pelletized product was prepared from material having this size.

As is shown by curves 22 through 38, the rates of hydration of the novel non-fused anhydrous sodium tetraborate of this invention are much higher than those of conventional fused anhydrous sodium tetraborate. The hygroscopic nature of the product of this invention renders is suitable for use as a desiccant, whereas the conventional fused product is not suitable for such use.

The process of this invention can be operated so as to produce the novel form of anhydrous sodium tetraborate in a wide range of particle sizes. Particle size can be controlled by several factors. For example, when the drying step of the process is operated at relatively low temperatures, e.g., about 400° C. to 525° C. and the feed rate of liquor supplied to the kiln is relatively high (higher than the heat absorption rate of the bed) the product will form large agglomerates having an average diameter of up to one half inch and even more. Large agglomerates can also be produced by heating the anhydrous product in the kiln at a relatively high temperature, e.g., about 600° C. to 700° C. and a liquor feed rate lower than the rate of heat absorption of the bed.

A product having a fine particle size, even as small as dust particles, can be produced by using relatively high temperatures and high feed rates. When a very fine product is desired, it can be withdrawn from the kiln as dust or fines from the bed. When a very fine product is not desired, the fines, including dust and bed fines, can be collected and recycled to the kiln where further deposition of anhydrous sodium tetraborate on the fine particles increases their size to that desired.

The present process provides a convenient and simple means of handling excess fines. Excess fines are recycled to the kiln immediately, or at any later time, as desired, without the necessity of dissolving them. This convenient, simple procedure avoids any problems involved in handling or providing for the special treatment of excess fines.

Particles of the novel form of anhydrous sodium tetraborate of this invention can be reduced in size, if desired, by mechanical means through a minimum expenditure of energy. This is in sharp contrast to fused anhydrous sodium tetraborate which requires large expenditures of energy to reduce it in size. Moreover, the fused product is so abrasive that it tends to destroy the reducing equipment. This contrast is attributable to the nature of the two materials. As indicated hereinbefore, the fused product resembles glass while the novel form of product of this invention is an unfused agglomerate.

The fused product tends to become contaminated with iron which is abroded from the reducing equipment during crushing and grinding operations. The novel product of this invention can be subjected to crushing and grinding procedures without such dangers of contamination since it can easily be reduced in size without appreciable abrasive action on the equipment.

The product of this invention can be readily pelletized into a coherent pellet by conventional procedures without the use of binders.

The novel form of anhydrous sodium tetraborate has a bulk density which is very similar or slightly heavier than that of fused anhydrous sodium tetraborate. Bulk density is conveniently measured as pour density and tap density. To measure pour bulk density the product is merely poured into a container and the density determined. To determine tap bulk density the product is poured into a container and the container is tapped gently until the product settles to an apparently constant volume, whereupon the density is determined.

The tap and bulk densities of the novel anhydrous sodium tetraborate and fused anhydrous sodium tetraborate were measured for the particular products defined below. The novel anhydrous product produced by spray drying as described in Example VIII, above, at a temperature of 600° C. to 630° C. using a 35% sodium tetraborate feed solution, was found to have tap and pour bulk densities of 70.7 pounds per cubic foot. The screen analysis for this product was as follows—

| Mesh size: | Cumulative weight, percent |
| --- | --- |
| +8 | 33.9 |
| +20 | 74.5 |
| +50 | 94.9 |
| +80 | 98.8 |
| +100 | 99 |
| −100 | 100 |

This novel product having the above screen analysis was hammer milled to produce a product having the following screen analysis—

| Mesh size: | Cumulative weight, percent |
| --- | --- |
| +8 | 1.3 |
| +20 | 30.8 |
| +50 | 70.8 |
| +80 | 83.3 |
| +100 | 85.6 |
| −100 | 100 |

The pour bulk density of this novel product was 71.8 pounds per cubic foot while the tap bulk density was 79.4 pounds per cubic foot.

A sample of fused anhydrous sodium tetraborate was found to have a pour bulk density of 69 pounds per cubic foot and a tap bulk density of 76 pounds per cubic foot. This sample of fused anhydrous sodium tetraborate was found to have the following screen analysis—

| Mesh size: | Cumulative weight, percent |
|---|---|
| +16 | 4 |
| +20 | 22 |
| +50 | 69 |
| +80 | 81 |
| +100 | 93 |
| −100 | 100 |

Both the tap and pour bulk densities of the novel product of this invention are comparable to those of a fused anhydrous sodium tetraborate. Thus, it is possible to store and handle the novel product of this invention with the same equipment and storage area as are required for handling the fused material since the products are of comparable bulk densities. It is possible to produce a novel product having a bulk density which is higher than that of the fused material. This denser material can be stored and handled in smaller containers than the fused material, for the same weight of material, which is an important advantage when only limited space is available to accommodate this material.

The novel form of anhydrous sodium tetraborate of this invention may be used in industry for many of the same purposes as the conventional fused borates. It is particularly useful in the glass industry in the manufacture of heat resistant glass and fibre glass. In the manufacture of such glass products the borates are melted with other raw materials and then spun through spinnerettes. In the past, difficulty sometimes has been experienced when fused borates have been used because of the presence in the melt of hard, refractory particles or granules which do not melt and subsequently cause clogging of the spinnerettes. Use of the novel borate of this invention overcomes or substantially minimizes this clogging problem.

As will be understood by those skilled in the art, what has been described is the preferred embodiment of the invention; however, many modifications, changes and substitutions can be made therein without departing from the scope and spirit of the following claims.

What is claimed is:

1. Process for producing anhydrous sodium tetraborate comprising:
   (A) preparing an aqueous liquor containing dissolved sodium tetraborate values and
   (B) spraying said liquor onto the surface of a heated particulate mass of anhydrous sodium tetraborate while heating said liquor to a temperature between about 400° C. to 700° C. to drive the water from association with said dissolved sodium tetraborate values and deposit the same as anhydrous sodium tetraborate.

2. Process for producing anhydrous sodium tetraborate comprising:
   (A) preparing an aqueous liquid mixture containing sodium tetraborate values and
   (B) contacting said liquor with the surface of a heated particulate mass of agitated anhydrous sodium tetraborate while heating said liquor to a temperature between about 400° C. to 700° C. to drive the water from association with said dissolved sodium tetraborate values and deposit the same as anhydrous sodium tetraborate.

3. Process for producing anhydrous sodium tetraborate comprising:
   (A) preparing an aqueous liquor containing dissolved sodium tetraborate values and
   (B) spraying said liquor onto the surface of a particulate mass of agitated anhydrous sodium tetraborate maintained at a temperature between about 400° C. and 700° C., while heating said liquor to a temperature between about 400° C. to 700° C. to drive the water from association with said dissolved sodium tetraborate values and deposit the latter as anhydrous sodium tetraborate.

4. Process for extracting sodium tetraborate values from an ore comprising tincal, kernite and gangue, comprising:
   (A) contacting said ore with an aqueous phase, to produce a liquid dispersion of a solution of sodium tetraborate containing undissolved gangue particles,
   (B) subjecting said dispersion to liquid-solid phase separation to produce a substantially gangue-free liquid mixture containing sodium tetraborate values, and
   (C) isolating anhydrous sodium tetraborate values from said liquid by heating said liquid mixture to a temperature between about 400° C. to 700° C. and contacting it with a heated particulate mass of anhydrous sodium tetraborate to drive the water from association with said sodium tetraborate values in said liquid and deposit the same as anhydrous sodium tetraborate.

5. Process for extracting sodium tetraborate values from an ore including tincal, kernite and gangue, comprising:
   (A) contacting said ore with an aqueous phase, to produce a fluid dispersion of a solution of sodium tetraborate containing gangue particles,
   (B) subjecting said dispersion to liquid-solid phase separation to produce a substantially gangue-free sodium tetraborate liquor, and
   (C) isolating anhydrous sodium tetraborate values from said gangue-free liquor by spraying said liquor onto the surface of a heated particulate mass of anhydrous sodium tetraborate while heating said liquor to a temperature between about 400° C. to 700° C. to deposit the sodium tetraborate values from said liquor as anhydrous sodium tetraborate.

6. A process for extracting sodium tetraborate values from a kernite ore containing a water-insoluble gangue comprising:
   (A) contacting said ore with an aqueous phase to form a mixture of ore in the aqueous phase, heating said mixture at atmospheric pressure for a period of time sufficient to dissolve a substantial amount of said kernite and produce an aqueous liquor having sodium tetraborate values dissolved therein and water-insoluble gangue suspended therein,
   (B) separating said water-insoluble gangue from said liquor, and
   (C) recovering anhydrous sodium tetraborate from said liquor by heating said liquor to a temperature between about 400° C. to 700° C. and spraying said heated liquor onto the surface of a particulate mass of anhydrous sodium tetraborate.

7. Process for extracting sodium tetraborate values from an ore comprising tincal, kernite and gangue, comprising:
   (A) contacting said ore with an aqueous phase to form a mixture of ore in the aqueous phase, heating said mixture at atmospheric pressure for a period of time sufficient to dissolve a substantial amount of said kernite and produce an aqueous liquor having sodium tetraborate values dissolved therein and water-insoluble gangue suspended therein,
   (B) subjecting said liquor to liquid-solid phase separation to produce a substantially gangue-free sodium tetraborate liquor, and
   (C) isolating anhydrous sodium tetraborate values from said gangue-free liquor by spraying said liquor onto the surface of an agitated recirculated load of particulate anhydrous sodium tetraborate maintained in a rotary kiln dehydrator at a temperature of between about 450° C. and about 650 C. while heating said liquor to a temperature between about 400° C.

to 700° C. to drive the water from association with said dissolved sodium tetraborate values and deposit the latter as anhydrous sodium tetraborate.

8. Process for producing non-fused anhydrous sodium tetraborate from a borate ore comprising:
(A) contacting said ore with an aqueous phase to form a mixture of ore in the aqueous phase, heating said mixture at atmospheric pressure to dissolve a substantial amount of the sodium tetraborate values in said ore and produce an aqueous liquor containing dissolved sodium tetraborate values and suspended gangue,
(B) subjecting said liquor to liquid phase-solid phase separation to produce a substantially gangue-free sodium tetraborate liquor, and
(C) isolating anhydrous sodium tetraborate values from said gangue-free liquor by applying said liquor at a sodium tetraborate concentration of 20% to 35% by weight of the liquor to the surface of an agitated particulate mass of anhydrous sodium tetraborate maintained at a temperature of between about 450° C. and about 650° C. while heating said liquor to a temperature between about 400° C. to 700° C. to drive the water from association with said dissolved sodium tetraborate values and deposit the latter as anhydrous sodium tetraborate.

References Cited

UNITED STATES PATENTS

| | | | |
|---|---|---|---|
| 2,073,827 | 3/1937 | Black | 23—59 X |
| 2,886,461 | 5/1959 | Taylor et al. | 23—59 X |
| 2,998,310 | 8/1961 | O'Brien et al. | 23—59 X |
| 3,186,791 | 6/1965 | Kloepfer et al. | 23—59 |

FOREIGN PATENTS 385,217  12/1932  Great Britain.

OSCAR R. VERTIZ, *Primary Examiner.*

H. T. CARTER, *Assistant Examiner.*